United States Patent
Ledieu et al.

(10) Patent No.: US 12,489,344 B2
(45) Date of Patent: Dec. 2, 2025

(54) ELECTRIC MOTOR COMPRISING A COOLING FLUID DEFLECTOR

(71) Applicant: NOVARES FRANCE, Clamart (FR)

(72) Inventors: Cédric Ledieu, Mont Saint Eloi (FR); Julien Brodnik, Loison sous Lens (FR)

(73) Assignee: NOVARES FRANCE, Clamart (FR)

( * ) Notice: Subject to any disclaimer, the term of this patent is extended or adjusted under 35 U.S.C. 154(b) by 210 days.

(21) Appl. No.: 18/273,806

(22) PCT Filed: Jan. 28, 2022

(86) PCT No.: PCT/FR2022/050160
§ 371 (c)(1),
(2) Date: Jul. 24, 2023

(87) PCT Pub. No.: WO2022/167747
PCT Pub. Date: Aug. 11, 2022

(65) Prior Publication Data
US 2024/0079934 A1    Mar. 7, 2024

(30) Foreign Application Priority Data
Feb. 4, 2021    (FR) ..................................... 21/01069

(51) Int. Cl.
*H02K 9/19*    (2006.01)
*H02K 5/173*    (2006.01)
*H02K 7/00*    (2006.01)

(52) U.S. Cl.
CPC ............. *H02K 9/19* (2013.01); *H02K 5/1732* (2013.01); *H02K 7/003* (2013.01)

(58) Field of Classification Search
CPC ....... H02K 9/19; H02K 5/17321; H02K 7/003
See application file for complete search history.

(56) References Cited

U.S. PATENT DOCUMENTS

| | | |
|---|---|---|
| 2009/0184592 A1 | 7/2009 | Sano et al. |
| 2018/0152078 A1 | 5/2018 | Yoshinori et al. |
| 2018/0205294 A1 | 7/2018 | Manabe et al. |
| 2019/0115800 A1 | 4/2019 | Yoshinori et al. |

FOREIGN PATENT DOCUMENTS

WO    2020125114 A1    6/2020

OTHER PUBLICATIONS

International Search Report for corresponding application PCT/FR2022/050160 filed Jan. 28, 2022; Mail date Mar. 25, 2022.

*Primary Examiner* — Terrance L Kenerly
(74) *Attorney, Agent, or Firm* — CANTOR COLBURN LLP

(57) ABSTRACT

The electric motor (1) comprises: —a shaft (2) mounted so as to be able to rotate about an axis (X); —a rotor (10) and a stator (20) received in a housing (30). The shaft (2) is engaged in an aperture in the front wall (32) and an aperture in the rear wall (33) of the housing (30), with a front bearing (37) and a rear bearing (38) being interposed respectively. It comprises an inner channel (4) for a cooling fluid circulation and at least one hole (5) in communication with the inner channel and leading into a front inner space (35) or rear inner space (36) of the housing (30). A deflector (40) that is fixed in relation to the shaft comprises a deflecting wall (41) that diverts the flow of cooling fluid entering the inner space from the hole towards the corresponding bearing.

11 Claims, 6 Drawing Sheets

ELECTRIC MOTOR COMPRISING A COOLING FLUID DEFLECTOR

TECHNICAL FIELD

The disclosure concerns an electric motor.

BACKGROUND

In general, the current electric motors include a rotor secured to a shaft and a stator which surrounds the rotor. The rotor and the stator are mounted in a casing which includes bearings for the rotational mounting of the shaft. The rotor may include a body formed by a lamination bundle or polar wheels (claw pole) held by means of a suitable fastening system. The body of the rotor includes inner cavities housing permanent magnets. The stator may include a body consisting of a lamination bundle forming a crown, whose internal face is provided with teeth delimiting two by two a plurality of slots open towards the inside of the stator body and intended to receive phase windings. These phase windings pass through the slots of the stator body and form winding heads projecting on either side of the stator body. The phase windings may for example consist of a plurality of U-shaped conductor segments, the free ends of two adjacent segments being connected together by welding.

The casing generally includes a front wall and a rear wall each forming a bearing which centrally carries a bearing for the rotational mounting of the rotor shaft.

The operation of the motor generates significant heat which results in particular from the current flowing through the phase windings of the stator. This heat, if it is not properly evacuated, can cause a significant rise in temperature of various components of the motor and the reduction of their lifespan, or even their degradation.

The solutions that currently exist for cooling the motor often require numerous structural modifications and are therefore complex and costly to implement. Furthermore, rotor cooling solutions are rarely provided, which involves a rise in temperature of the bearings. In addition, these bearings may experience other constraints; in particular, the front bearing also receives the heat from the reduction mechanism located upstream of the front wall of the casing and contributes to the force recovery. It is therefore imperative, in order to prevent the rise in temperature of these bearings from having a significant impact on their lifespan, to provide a solution allowing ensuring their efficient cooling and advantageously relatively simple to implement.

BRIEF SUMMARY

The present disclosure aims to remedy the drawbacks mentioned above.

To this end, the disclosure concerns an electric motor comprising:
- a shaft rotatably mounted about an axis (X);
- a substantially cylindrical rotor securely mounted in rotation on the shaft, the rotor having a front lateral face and a rear lateral face orthogonal to the axis (X);
- a stator including an annular body which surrounds the rotor coaxially to the shaft, and which has a front lateral face and a rear lateral face orthogonal to the axis, the stator including a winding forming winding heads projecting axially from either side of the stator body;
- a substantially cylindrical casing receiving the rotor and the stator, the casing including a peripheral wall, a front wall and a rear wall orthogonal to the axis (X), an inner space, respectively front and rear, being provided between the front wall of the casing and the front lateral face of the stator, respectively between the rear wall of the casing and the rear lateral face of the stator, the winding heads being housed in the inner spaces;
- the shaft being engaged in an orifice in the front wall and an orifice in the rear wall of the casing, with the interposition of a bearing, respectively a front bearing and a rear bearing, the shaft including at least one inner channel for circulating a cooling fluid and at least one hole in fluid communication with the inner channel and opening into at least one of the front, respectively rear, inner spaces of the casing.

According to a general definition of the disclosure, the motor comprises a deflector which is fastened relative to the shaft, and which includes at least one deflecting wall configured to divert in the direction of the corresponding front, respectively rear bearing, the cooling fluid flow opening into the inner space from the shaft hole, so that the cooling fluid can be projected onto the deflecting wall and spray the bearing, thereby ensuring the cooling of the bearing. In addition, the deflector includes a collar disposed about the shaft, the deflecting wall(s) being located between the shaft and the collar, preferably secured to the internal face of the collar.

The disclosure thus offers a solution for cooling the bearing(s) which is effective, in particular because the cooling fluid is directed towards the bearing itself. Furthermore, the solution according to the disclosure is simple to implement. Indeed, on the one hand, the deflector is a means whose structure can be relatively simple and can be integrated into an existing motor structure without requiring substantial modifications. On the other hand, the disclosure takes advantage of already existing elements, in particular the cooling fluid circuit. It follows that the lifespan of the bearings can be considerably improved without incurring a significant additional cost.

The collar can form a support for the deflecting wall(s). The collar can also promote the channeling of the cooling fluid and limit its dispersion inside the casing.

The cooling fluid is preferably a liquid and can typically be an oil.

The deflecting wall may have an operational face which is curved or substantially flat and inclined with respect to the axis (X), and which is oriented towards the hole and towards the bearing. By «operational face», it should be understood the face of the deflecting wall which provides the expected result, that is to say which produces the deflection. In other words, the hole in the shaft can open into the inner space substantially facing the operational face.

According to one possible embodiment, the shaft hole is substantially radial, and the deflecting wall has an operational face which is inclined with respect to the axis (X), said operational face being oriented towards the hole and towards the bearing. The angle between the operational face and the axis (X) can be close to 45°.

The deflecting wall is for example in the form of a rib located in a plane passing through the axis (X), one edge of the rib being oriented towards the hole and towards the bearing and forming the operational face. By «rib», it should be understood a flat element of small thickness, the operational face corresponding to the thin edge of the rib, that is to say its rim. The thickness of the rib can be close to the diameter of the shaft hole.

Opposite the operational face, the deflecting wall may have a first face substantially orthogonal to the axis (X) and a second face substantially parallel to the axis (X).

The rib may thus have the shape of a right-angled triangle. The two faces opposite to the operational face can be joined by a fillet or a chamfer. The edge opposite to the operational face can constitute an edge for connection to a support structure of the rib.

Preferably, the collar and the rib(s) are separate elements, which have separate functions. Thus, the function of the rib, by means of the deflecting wall, is to divert the cooling fluid flow, while the collar has a function of channeling the fluid and/or of support, as indicated above. This does not exclude that a portion of the flow may reach the collar and be diverted by it, but this portion is negligible compared to the total flow of fluid opening into the corresponding inner space. Moreover, if the collar and the rib(s) are separate elements, this does not exclude that these two elements can be secured to each other and belong to the same part.

According to one possible embodiment, the shaft includes N holes in fluid communication with the inner channel and opening into an inner space of the casing, with N≥1 (preferably N≥2); in addition, the deflector comprises a deflecting wall facing each or some of the holes. Preferably, the holes are substantially radial, have a same median plane orthogonal to (X) and are angularly regularly spaced.

Thus, a given deflecting wall can be dedicated to a given hole. Alternatively, we could imagine the same deflecting wall being common to several holes.

For example, it is possible to have two coaxial holes opening into an inner space of the casing at two points of the shaft which are diametrically opposed, as well as a deflecting wall facing each hole. According to another example, it is possible to have four holes at 90° of one another, a deflecting wall arranged facing two coaxial holes, and no deflecting wall facing the two other coaxial holes.

The collar may typically be cylindrical. This does not impose a circular section. Thus, the section of the collar (orthogonally to the axis) can be oval or oblong; it may include curved parts and straight parts.

According to one embodiment, the collar is continuous, preferably substantially cylindrical and coaxial to the shaft. By «continuous» it should be understood that the collar is circumferentially continuous. With this configuration, when there are several holes, the deflector preferably comprises a deflecting wall facing each of the holes. The collar thus makes it possible to contain the cooling fluid as much as possible.

According to another embodiment, the collar is discontinuous and includes collar portions circumferentially spaced from each other so as to provide an opening between two adjacent collar portions. The deflecting wall(s) are then arranged between the shaft and a collar portion (in other words, there is no deflecting wall facing an opening). Furthermore, at least one deflector wall is located facing a shaft hole, and at least one opening is located facing a shaft hole. With this configuration, the cooling fluid coming from the hole(s) facing an opening of the collar can reach the winding heads of the stator in order to cool them.

Typically, it can be provided that each deflecting wall faces a shaft hole, and each opening faces a shaft hole.

The deflector may include an annular portion mounted on and coaxially to the shaft, in the inner space of the casing, the deflecting wall(s) being secured to the face of the annular portion opposite to the rotor. The annular portion thus forms a support for the deflecting wall(s), which project from this annular wall. If the deflector includes a collar, this may project from the annular portion opposite the rotor; furthermore, the collar may have the same axis as the annular portion. The collar may project from the peripheral edge of the annular portion.

According to one embodiment, the deflector is made in one piece with a flange which has the shape of a disc having a diameter substantially identical to the diameter of the rotor, the flange being closely mounted coaxially to the shaft, in the inner space of the casing and contiguous to the corresponding lateral face of the rotor, the deflecting wall(s) projecting from the flange opposite the rotor.

The annular portion of the deflector can form the central part of the flange, and may for example have an external diameter less than 70% of the diameter of the rotor. In other words, the annular part of the deflector is extended radially outwards by an annular element which has an external diameter substantially identical to the diameter of the rotor and with which it forms a flange. This flange can form a balancing flange.

According to another embodiment, the annular portion has an external diameter less than 70% of the diameter of the rotor and the deflector forms an independent part—that is to say not secured to other parts of the motor before the assembly. The deflector may in particular form a separate part from any flange. The deflector can be directly fastened to the lateral face of the rotor, or to a balancing flange itself fastened to the lateral face of the rotor.

According to one possible embodiment, two deflectors can be provided. More specifically, according to this embodiment, the shaft includes at least one front hole in fluid communication with the inner channel and opening into the front inner space of the casing, and a rear hole in fluid communication with the inner channel and opening into the rear inner space of the casing, and the motor comprises:
 a front deflector configured to divert the cooling fluid flow opening into the front inner space, from the front hole(s), in the direction of the front bearing;
 and a rear deflector configured to divert the cooling fluid flow opening into the rear inner space, from the rear hole(s), in the direction of the rear bearing.

BRIEF DESCRIPTION OF THE DRAWINGS

It is now described, as non-limiting examples, several possible embodiments of the disclosure, with reference to the appended figures.

DETAILED DESCRIPTION

Throughout the description and in the claims, the terms «axial» and «radial» and their derivatives are defined with respect to the axis of rotation of the rotor (X). Thus, an axial—or longitudinal—orientation refers to an orientation parallel to the axis of rotation of the rotor, and a radial orientation refers to an orientation perpendicular to the axis of rotation of the rotor. Also, by convention, the terms «front» and «rear» refer to separate positions along the axis of rotation of the rotor. In particular, the «front» end of the rotor shaft corresponds to the end of the shaft on which can be fastened a pulley, a pinion, a groove intended to transmit the rotational movement of the rotor to any other similar movement transmission device. Furthermore, the term «internal» refers to an element located closer to the axis of the rotor than an element referred to as «external».

Figure 1:
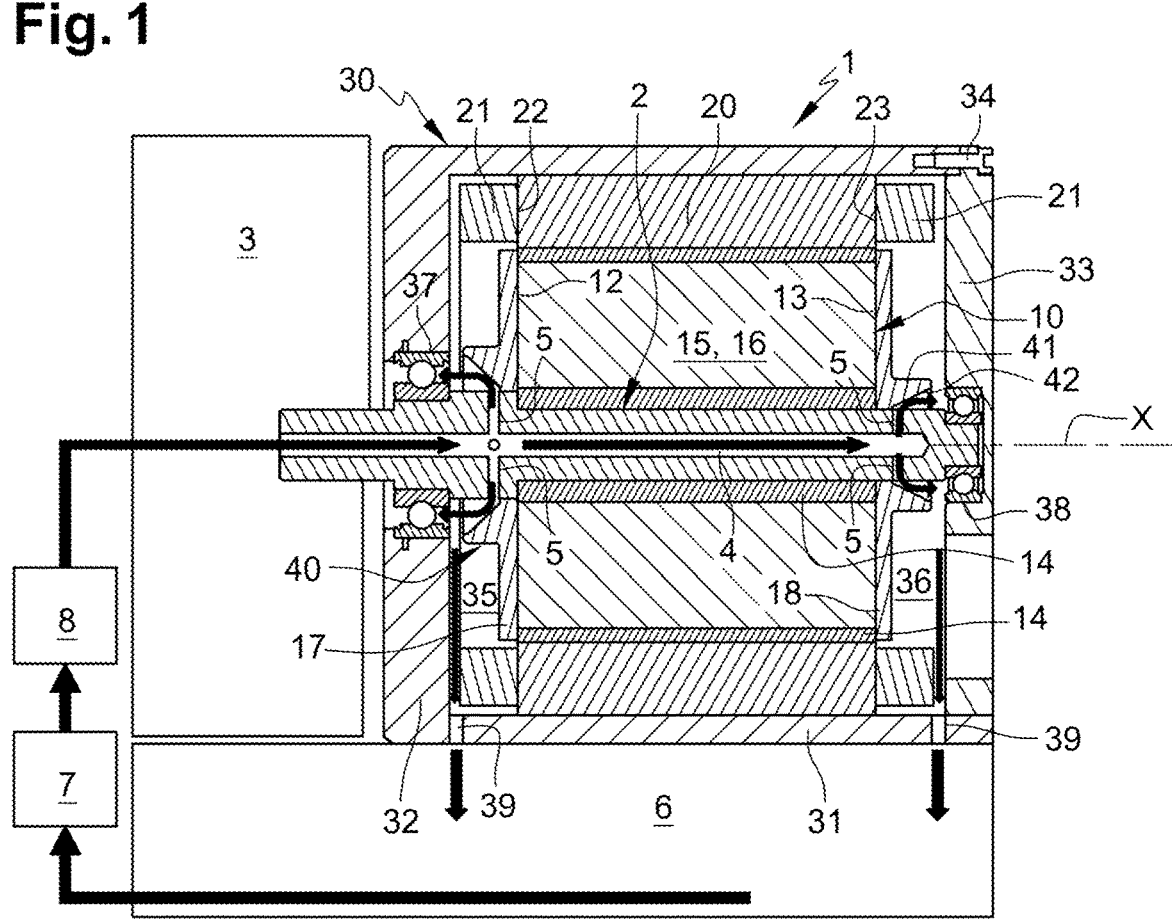
FIG. 1 is a longitudinal sectional view of an electric motor according to the disclosure, comprising a shaft, a rotor and a stator housed in a casing, a transmission device, a tank, a pump, an exchanger.

FIG. 1 represents an electric motor 1 according to the disclosure.

The motor 1 comprises a shaft 2 rotatably mounted about an axis X. In operation, at the front, the shaft 2 is coupled to a movement transmission device 3, in particular a reduction gear.

Figure 11:
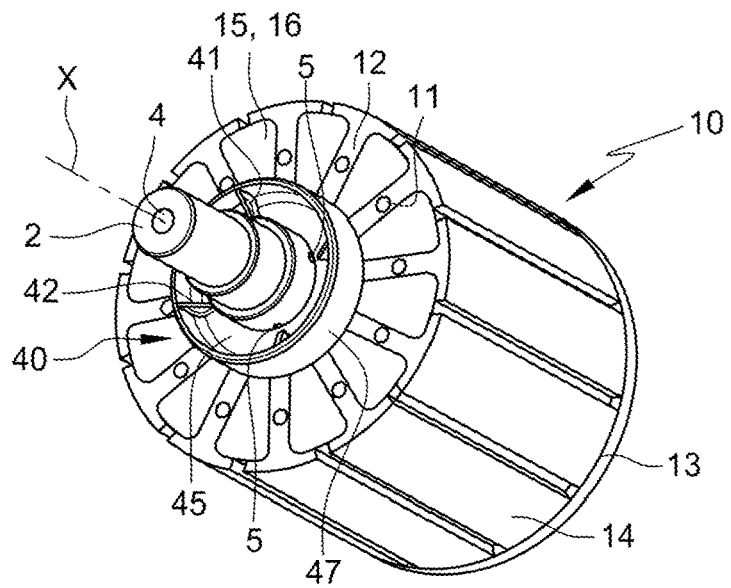
FIG. 11 is a front perspective view, showing an assembly including the rotor, the shaft and a deflector, according to yet another embodiment of the disclosure.
Figure 12:
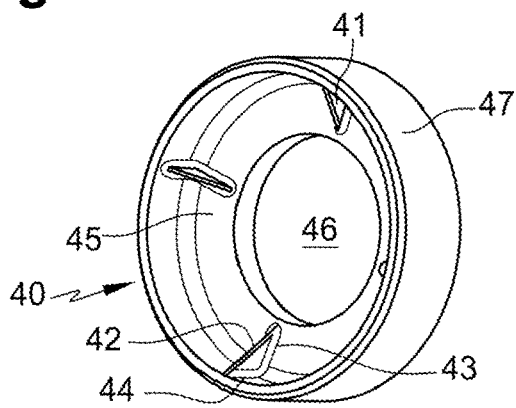
FIG. 12 is a perspective view of the front deflector of FIG. 11.
Figure 13:
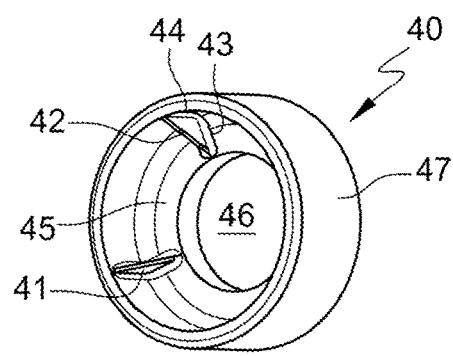
FIG. 13 is a perspective view of the rear deflector of the assembly of FIG. 11.
Figure 14:
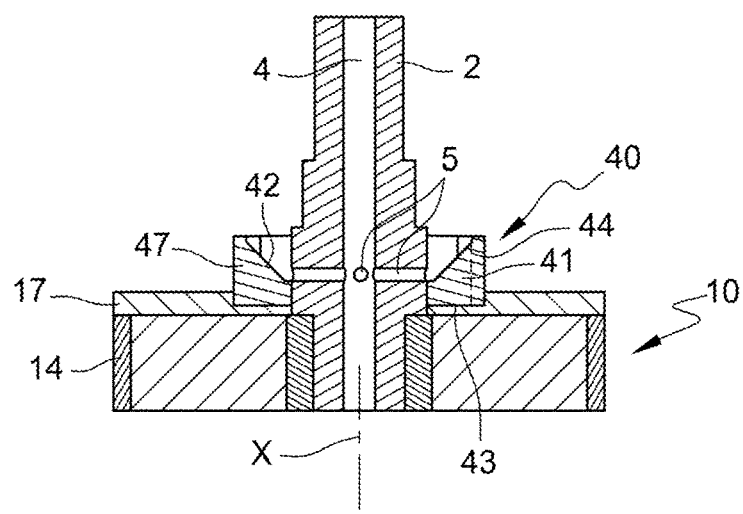
FIG. 14 is a truncated longitudinal sectional view of the assembly of FIG. 11.
Figure 15:
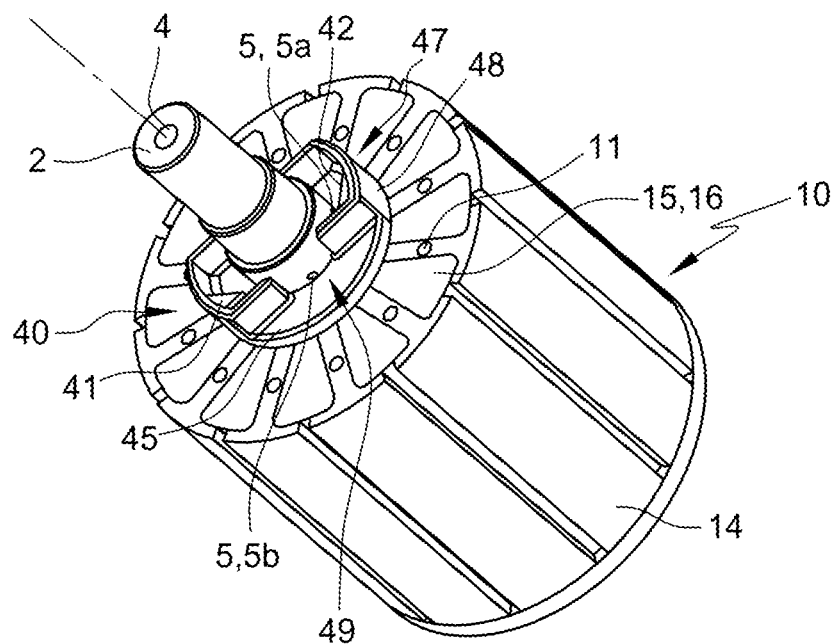
FIG. 15 is a front perspective view, showing an assembly including the rotor, the shaft and a deflector according to yet another embodiment of the disclosure.

The motor 1 further comprises a rotor 10 which includes a substantially cylindrical body coaxially mounted on the shaft 2 and secured in rotation, for example by a force fit of the shaft 2 in a central opening of the body. The body of the rotor 10 can typically be formed by a lamination stack 14 made of a ferromagnetic material, in particular steel. The rotor 10 further comprises a plurality of permanent magnets 15 housed in at least some cavities 16 formed inside the lamination stack 14. As seen in FIGS. 11 and 15, the cavities 16 may have a prismatic shape with triangular base, having a point directed towards the axis X, and being angularly regularly spaced about the axis X. A plurality of axially traversing fastening holes 11 are made in the lamination stack 14, to allow the passage of fastening screws (not shown) in the laminations of the lamination stack. The rotor 10 has a front lateral face 12 and a rear lateral face 13 orthogonal to the axis X.

The motor 1 also comprises a stator 20 including an annular body which surrounds the rotor 10 coaxially to the shaft 2. The stator 20 has a front lateral face 22 and a rear lateral face 23 which are orthogonal to the axis X and which are substantially located in the same plane as the front 12 and rear 13 lateral faces of the rotor 10, respectively. The stator 20 includes a winding forming winding heads 21 which axially project on either side of the body of the stator 20.

The rotor 10, the stator 20 and part of the shaft 2 are housed in a substantially cylindrical casing 30. The casing 30 includes a peripheral wall 31, a front wall 32 and a rear wall 33 orthogonal to the axis X. According to one possible embodiment, the peripheral wall 31 and the front wall 32 are made in one piece, while the rear wall 33 is a separate part which is fastened on the peripheral wall 31, for example by means of screws 34. The casing can be made of metal.

A front inner space 35 is provided between the front wall 32 of the casing 30 and the front lateral face 22 of the stator 20; a rear inner space 36 is provided between the rear wall 33 of the casing 30 and the rear lateral face 23 of the stator 20. The winding heads 21 are housed in the corresponding inner spaces 35, 36.

The shaft 2 is engaged in an orifice in the front wall 32 and an orifice in the rear wall 33 of the casing 30, with the interposition of a bearing, respectively a front bearing 37 and a rear bearing 38. It can for example be a ball bearing.

The shaft 2 includes at least one inner channel 4 for circulating a cooling fluid and at least one hole 5 in fluid communication with the inner channel 4 and opening into an inner space 35, 36 of the casing 30. Typically, the inner channel 4 can be axial and open at the front end of the shaft 2, while the hole(s) 5 can be radial.

Preferably, the shaft 2 includes at least one front hole 5 in fluid communication with the inner channel 4 and opening into the front inner space 35 of the casing 30, and at least one rear hole 5 in fluid communication with the inner channel 4 and opening into the rear inner space 36 of the casing 30.

The inner channel 4 may extend into the shaft 2 from the front end of the shaft 2, continuously between the front hole(s) and the rear hole(s), and be closed at its rear end, as illustrated in FIG. 1. In a variant not represented, the inner channel 4 could include a blind front portion opening into the front face of the shaft 2 and a blind rear portion opening into the rear face of the shaft 2, these two portions of the inner channel 4 being separated by a solid part of the shaft 2. In a variant not represented, the inner channel 4 could be open from the shaft 2, and a plug at the end of the shaft 2 could be attached in order to make the inner channel 4 blind.

Figure 5:
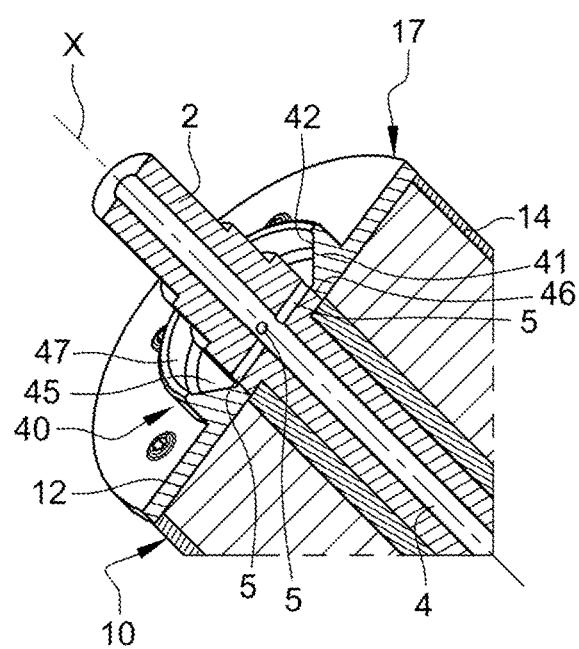
FIG. 5 is a longitudinally cut partial perspective view of the assembly of FIG. 4.
Figure 6:
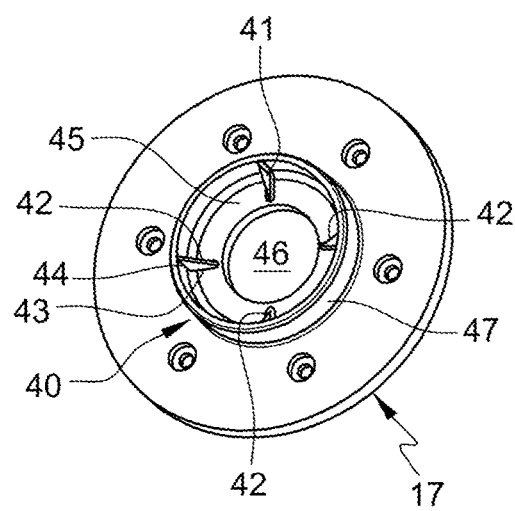
FIG. 6 is a perspective view of the front deflector of FIGS. 3 and 4.
Figure 8:
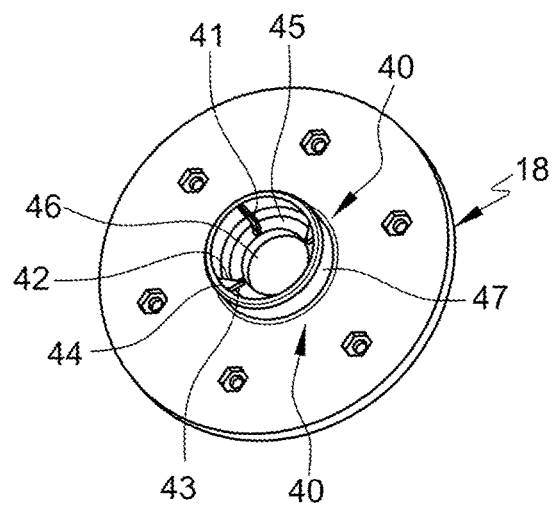
FIG. 8 is a perspective view of the rear deflector of FIG. 7.
Figure 7:
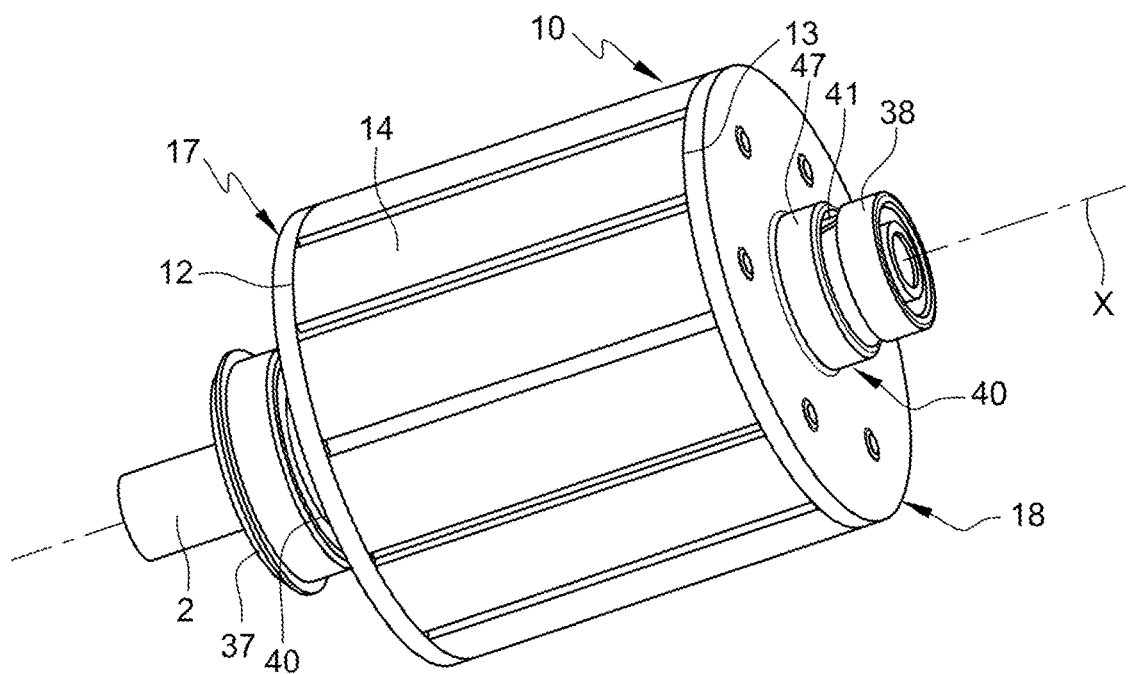
FIG. 7 is a rear perspective view similar to FIG. 3.

In the represented embodiment, in FIG. 5, which should not be considered as limiting, the shaft includes, at the front as well as at the rear, four holes 5 in fluid communication with the inner channel 4 and opening into the front 35, respectively rear 36, inner space of the casing 30. These four holes 5 are preferably substantially radial, have the same median plane orthogonal to the axis X and are angularly spaced from each other by 90°. These holes 5 can each be of different diameter, in order to radially project the oil according to a desired jet flow rate. These holes 5 can also be stepped to balance the desired jet flow rate.

It can thus be established a cooling fluid circulation in the motor 1, as represented by the arrows in FIG. 1. The cooling fluid contained in a tank 6 can pass through a pump 7 and then an exchanger 8—for example water exchanger—to allow it to cool, before being brought into the inner channel 4 of the shaft 2. The cooling fluid then circulates via the holes 5 to open into the inner space(s) 35, 36 in order to cool the bearings of the motor 30. Then the cooling fluid falls by gravity and is evacuated towards the tank 6 through openings 39 provided in the casing 30, for example in the peripheral wall 31 of the latter.

In addition, the motor 1 comprises a deflector 40 which is fastened relative to the shaft 2 and which includes at least one deflecting wall 41 configured to divert in the direction of the corresponding bearing 37, 38 the cooling fluid flow opening into the inner space 35, 36 from the hole 5 of the shaft 2.

The cooling fluid can thus be projected onto the deflecting wall 41 and spray the bearing 37, 38, thus ensuring particularly efficient cooling of the bearing. Furthermore, the cooling fluid can be selected to also have lubricating properties, which makes it possible to avoid providing, in addition, a separate system for lubricating the bearing(s) 37, 38.

According to the embodiments, the deflector 40 can be fastened on the rotor 10 or force-fitted on the shaft 2.

In the represented embodiments, the motor 1 comprises:
 a front deflector 40 configured to divert the cooling fluid flow opening into the front inner space 35, from the front hole(s) 5, in the direction of the front bearing 37;
 and a rear deflector 40 configured to divert the cooling fluid flow opening into the rear inner space 36, from the rear hole(s) 5, in the direction of the rear bearing 38.

Nonetheless, only a front deflector, or only a rear deflector, could be provided.

For simplicity, the front deflector 40 is described in more detail below, it being specified that the rear deflector may have a similar structure.

Figure 2:
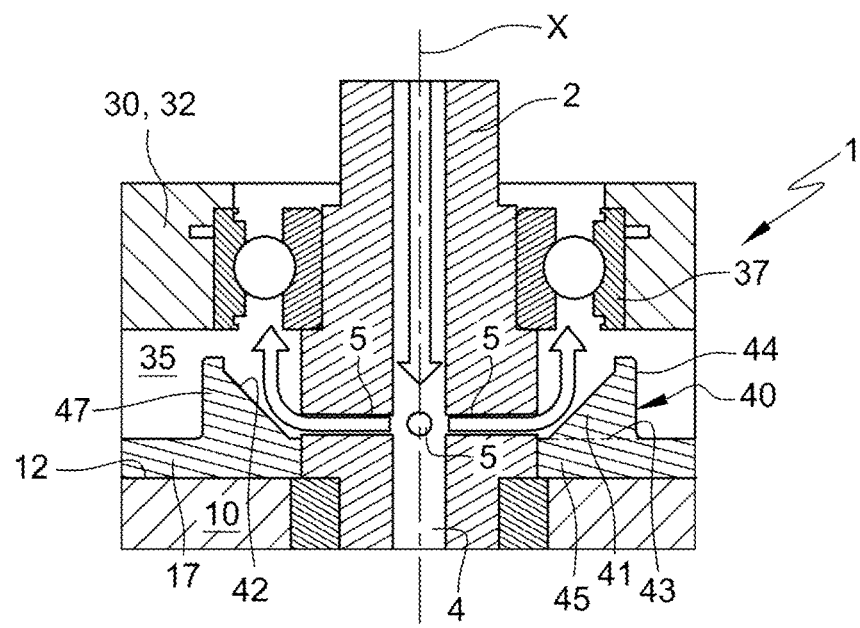
FIG. 2 is a detail view of FIG. 1, showing a deflector diverting a cooling fluid towards a bearing of the electric motor.
Figure 3:
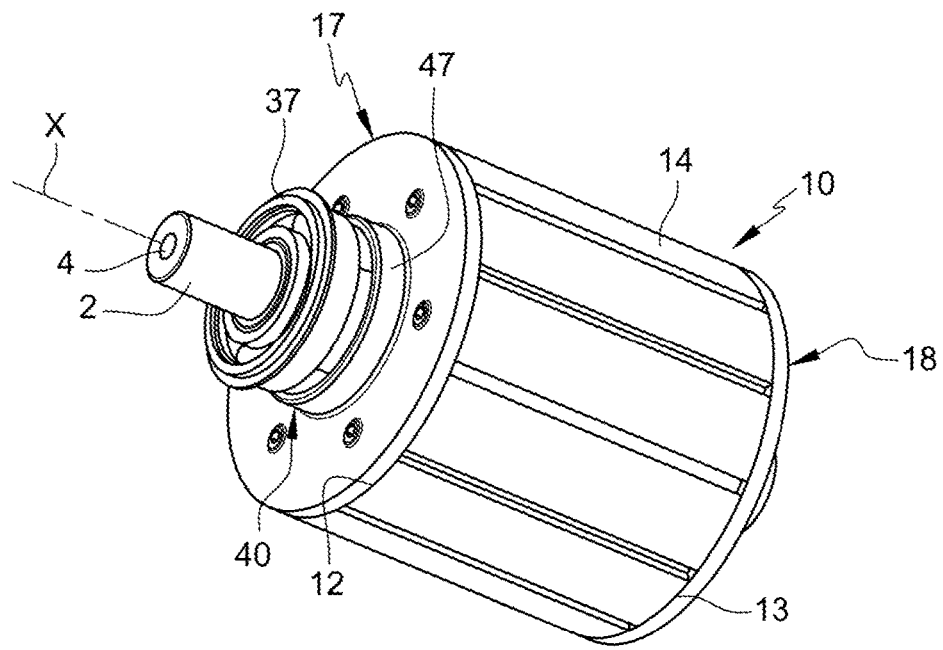
FIG. 3 is a front perspective view, showing an assembly including the rotor, the shaft, the front bearing and a deflector, according to an embodiment of the disclosure.

As seen in FIG. 2, the deflecting wall 41 has an operational face 42 which is substantially flat and inclined with respect to the axis X and which is oriented towards the hole 5 and towards the bearing 37. With a hole 5 substantially radial, the operational face 42 can be inclined with respect to the axis X by an angle close to 45°. The cooling fluid flow can thus be diverted by approximately 90°, between a substantially radial incident direction and a substantially axial diverted direction.

Alternatively, the operational face 42 could not be flat but curved.

Figure 4:
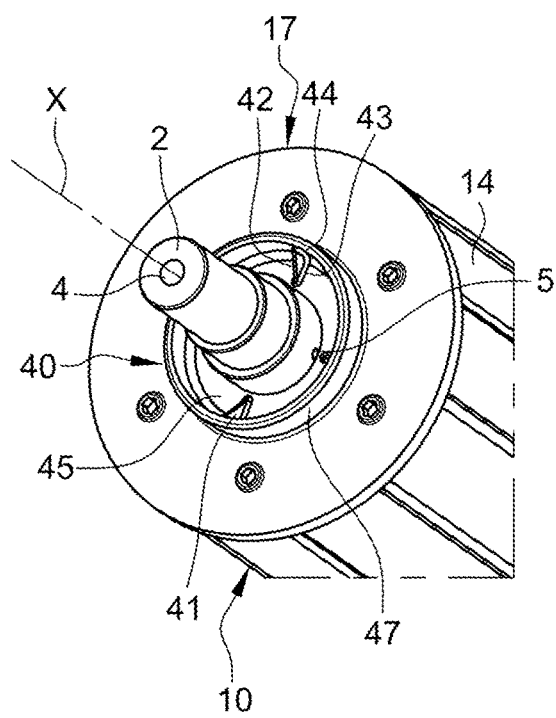
FIG. 4 is a detail view of FIG. 3, the front bearing not being represented.

As seen in particular in FIG. 4, the deflecting wall 41 may be in the form of a rib located in a plane passing through the axis X. The rib 41 may have the shape of a right-angled triangle having:
 an edge oriented towards the hole 5 and towards the bearing 37 and forming the operational face 42
 and, opposite the operational face 42, a first face 43 substantially orthogonal to the axis X and a second face 44 substantially parallel to the axis X.

The deflector 40 may further include an annular portion 45 provided with a central orifice 46. The deflecting walls 41 are secured to the annular portion 45; typically, the first face 43 can be secured to a face of the annular portion 45. The annular portion 45 is mounted on and coaxially to the shaft 2, in the inner space 35 of the casing 30, so that the face of the annular portion 45 from which the deflecting walls 41 project faces the bearing 37, and that the opposite face of the annular portion 45 faces, or even is adjacent to, the front face 12 of the rotor 10.

The deflector 40 may also include a collar 47 which projects from the annular portion 45, preferably orthogonally from the outer peripheral edge of the annular portion 45, and in the same direction as the deflecting walls 41. The deflecting walls 41 may be secured to the internal face of the collar 47; typically, the second face 44 can be secured to the internal face of the collar 47. In the mounted position, the collar 47 is therefore disposed about the shaft 2, and preferably coaxially thereto, the deflecting walls 41 are located between the shaft 2 and the collar 47. The collar 47 can be cylindrical, not necessarily circular in section.

According to one possible embodiment, the external diameter of the annular portion 45, that is to say in certain cases the external diameter of the collar 47, may for example be less than 70% of the diameter of the rotor.

The deflector 40—namely the deflecting walls 41, the annular portion and the collar 47—can be made in one piece, of plastic material, in particular by injection.

According to one embodiment represented in FIGS. 3 to 8, the collar 47 is continuous, preferably has a circular shape, and is arranged coaxially to the shaft 2. The deflector 40 comprises a deflecting wall 41 facing each of the holes 5, as can be seen in particular in FIG. 4. Therefore, a deflecting wall 41 dedicated to each of the holes 5 is provided, that is to say four deflecting walls 41 arranged at 90° of one another. Such an embodiment makes it possible to cool the bearing 37.

Furthermore, the deflector 40 is made in one piece with a flange which has the shape of a disc having a diameter substantially identical to the diameter of the rotor 10. Thus, beyond the collar 47, the annular portion 45 of the deflector 40 is extended radially outwards by an annular element which has an external diameter substantially identical to the diameter of the rotor and with which it forms a flange. The annular portion 45 therefore forms the central part of the flange. It can typically be a balancing flange.

Concretely, the flange is mounted on and coaxially to the shaft 2, orthogonal to the axis X, in the inner space 35 of the casing 10 and contiguous to the corresponding lateral face of the rotor 10. The motor 1 can include a front flange 17 mounted against the front lateral face 12 of the rotor 10, and a rear flange 18 mounted against the rear lateral face 13 of the rotor 10, the flanges 17, 18 being held tight on the lamination stack, fitted about the shaft by screws passing inside the holes 11 made in the lamination stack 14, and nuts.

Figure 9:
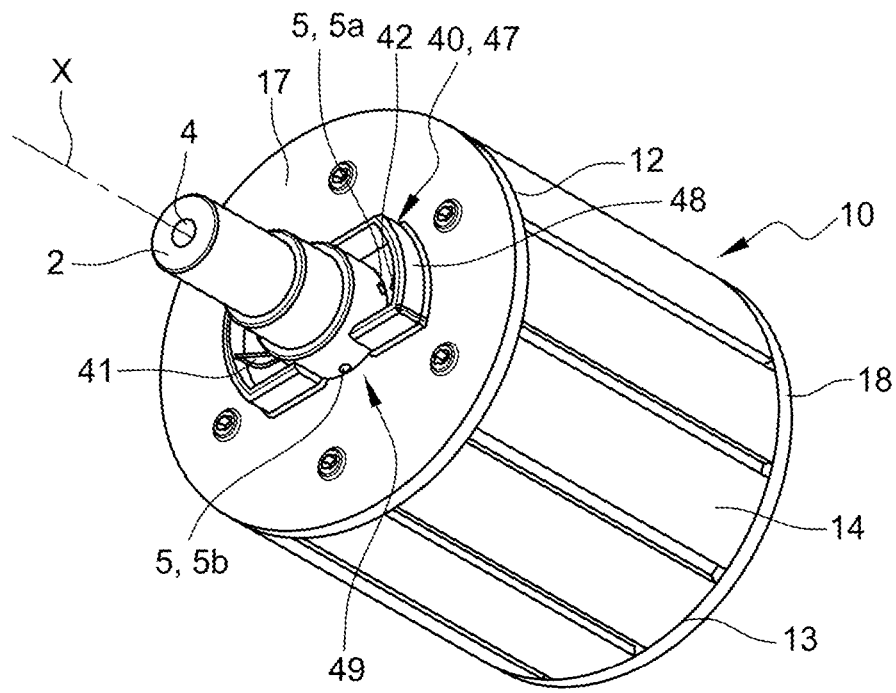
FIG. 9 is a front perspective view, showing an assembly including the rotor, the shaft and a deflector, according to another embodiment of the disclosure.
Figure 10:
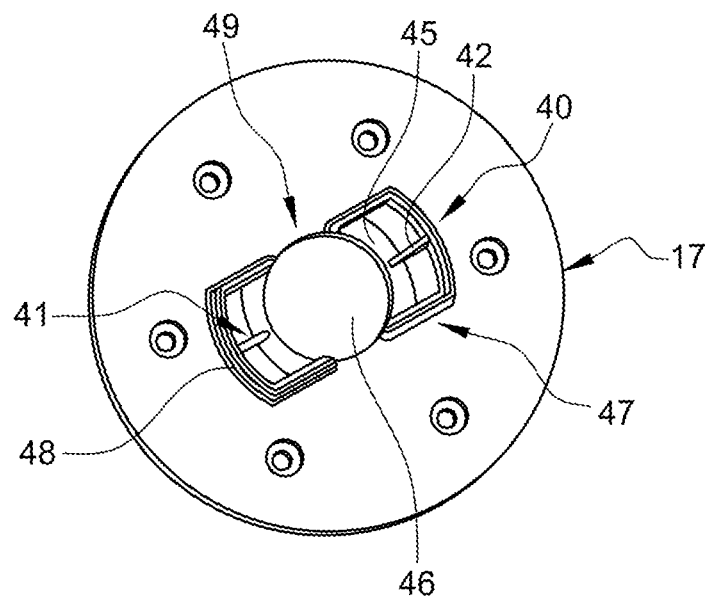
FIG. 10 is a perspective view of the front deflector of FIG. 9.

According to another embodiment represented in FIGS. 9 and 10, the deflector 40 is, as described above, made in one piece with a flange which has the shape of a disc having a diameter substantially identical to the diameter of the rotor 10.

However, the collar 47 is discontinuous. The collar 47 thus includes collar portions 48 spaced circumferentially from each other so as to form an opening 49 between two adjacent collar portions 48.

It should be noted that the collar 47 can be cylindrical, but of non-circular section. Thus, for example, the deflector 40 comprises two collar portions 48 each including a curved part, the concavity of which is directed towards the axis X, these two curved parts being diametrically opposed. Each curved part can also be extended at each of its axial edges by substantially flat parts, so that the two collar portions 48 form U shapes open towards the axis X and towards each other, by forming between them two diametrically opposed openings 49.

As seen in FIG. 9, the openings 49 are each arranged facing a hole 5b, while the collar portions 48—and more particularly the curved parts thereof—are each arranged facing a hole 5a. Furthermore, a deflecting wall 41 is arranged facing each hole 5a which faces a collar portion 48.

With this configuration, the cooling fluid exiting through one of the holes 5a is diverted by the corresponding deflecting wall 41, in order to be directed towards the bearing 37. In addition, the cooling fluid exiting through one of the holes 5b is not diverted and passes through the opening 49, so that it can reach the winding heads 21 of the stator. Such a discontinuous collar 47 structure thus makes it possible to achieve both cooling of the bearings and of the winding heads of the stator.

It should be noted that, although only the front face 12 of the rotor 10 and the front deflector 40 are visible in FIGS. 9 and 10, the same structure may be present on the rear face 13 of the rotor 10.

According to another embodiment represented in FIGS. 11 to 17, the deflector 40 forms an independent part, which in particular is not integrated into a flange. Thus, the annular portion 45 does not extend and is not radially extended beyond the collar 47, as can be seen in particular in FIGS. 12, 13 and 17. FIGS. 11, 14, 15 and 16 show that the deflector 40 forms a separate part.

In the variant illustrated in FIGS. 11 to 14, the deflector includes a continuous collar 47 of circular shape, as well as four deflecting walls at 90° of one another, each arranged facing a hole 5 of the shaft 2. In FIG. 11, the deflector 40 is mounted directly against the front lateral face 12 of the rotor 10, while in FIG. 14, the deflector 40 is mounted on a front flange 17—from which it is initially separate—the front flange 17 being itself mounted against the front lateral face 12 of the rotor 10.

Figure 16:
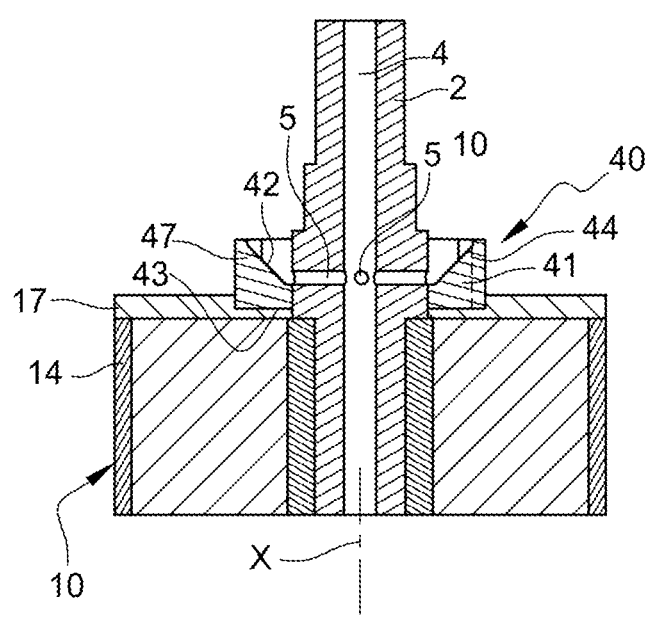
FIG. 16 is a truncated longitudinal sectional view of the assembly of FIG. 15.
Figure 17:
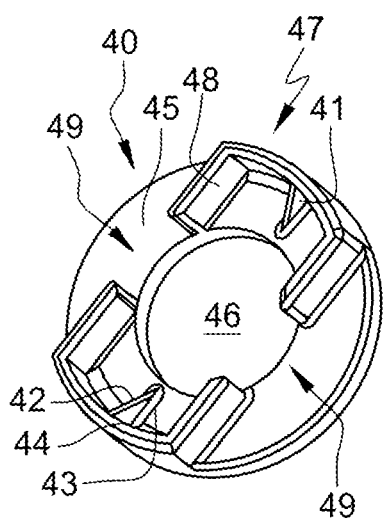
FIG. 17 is a perspective view of the front deflector of FIG. 15.

In the variant illustrated in FIGS. 15 to 17, the deflector includes a discontinuous collar 47, including collar portions 48 provided with deflecting walls 41 facing holes 5a of the shaft 2, for the cooling of the bearing 37, and openings 49 facing holes 5a of the shaft 2, without the interposition of a deflecting wall 41, for the cooling of the winding heads 21 of the stator. The collar 47 may have a geometry identical to that described in relation to FIGS. 9 and 10.

In FIG. 15, the deflector 40 is mounted directly against the front lateral face 12 of the rotor 10, while in FIG. 16, the deflector 40 is mounted on a front flange 17—from which it is initially separate—the front flange 17 being itself mounted against the front lateral face 12 of the rotor 10.

It should be noted that, although only the front face 12 of the rotor 10 and the front deflector 40 are visible in FIGS. 11, 14, 15 and 16, the same structure may be present on the rear face 13 of the rotor 10.

It goes without saying that the disclosure is not limited to the embodiments described above as examples but that it comprises all the technical equivalents and variants of the described means as well as their combinations.

The invention claimed is:

1. An electric motor comprising:
   a shaft rotatably mounted about an axis;
   a substantially cylindrical rotor securely mounted in rotation on the shaft, the rotor having a front lateral face and a rear lateral face orthogonal to the axis;
   a stator including an annular body which surrounds the rotor coaxially to the shaft, and which has a front lateral face and a rear lateral face orthogonal to the axis, the stator including a winding forming winding heads axially projecting on either side of the body of the stator;
   a substantially cylindrical casing receiving the rotor and the stator, the casing including a peripheral wall, a front wall and a rear wall orthogonal to the axis, an inner space, respectively front and rear, being provided between the front wall of the casing and the front lateral face of the stator, respectively between the rear wall of the casing and the rear lateral face of the stator, the winding heads being housed in the inner spaces;
   the shaft being engaged in an orifice in the front wall and an orifice in the rear wall of the casing, with the interposition of bearings, respectively a front bearing and a rear bearing, the shaft including at least one inner channel for circulating a cooling fluid and at least one hole in fluid communication with the inner channel and opening into at least one of the front, respectively rear inner spaces of the casing;
   wherein the motor comprises a deflector which is fastened with respect to the shaft, and which includes at least one deflecting wall configured to divert in the direction of the corresponding front, respectively rear bearing the cooling fluid flow opening into the inner space from the hole of the shaft, so that the cooling fluid can be projected onto the deflecting wall and spray the bearing, thus ensuring the cooling of the bearing, and in that the deflector includes a collar disposed about the shaft, the deflecting wall(s) being located between the shaft and the collar, secured to the internal face of the collar; and
   wherein the deflecting wall is in the form of a rib located in a plane passing through the axis, an edge of the rib being oriented towards the hole and towards the bearing and forming the operational face.

2. The electric motor according to claim 1, wherein the deflecting wall has an operational face which is curved or substantially flat and inclined with respect to the axis, and which is oriented towards the hole of the shaft and towards the bearing.

3. The electric motor according to claim 1, wherein the hole is substantially radial, and in that the deflecting wall has an operational face which is inclined with respect to the axis, said operational face being oriented towards the hole and towards the bearing.

4. The electric motor according to claim 1, wherein, opposite the operational face, the deflecting wall has a first face substantially orthogonal to the axis and a second face substantially parallel to the axis.

5. The electric motor according to claim 1, wherein the shaft includes N holes in fluid communication with the inner channel and opening into an inner space of the casing, with N≥1, where the holes are substantially radial, have the same median plane orthogonal to and are angularly regularly spaced, and in that the deflector comprises a deflecting wall facing each or some of the holes.

6. The electric motor according to claim 5, wherein the collar is discontinuous and includes collar portions spaced circumferentially from each other so as to form an opening between two adjacent collar portions, the deflecting wall(s) being only arranged between the shaft and a collar portion, wherein at least one deflecting wall is located facing a hole (5, 5a) of the shaft, and at least one opening is located facing a hole (5, 5b) of the shaft.

7. The electric motor according to claim 1, wherein the collar is continuous, substantially cylindrical and coaxial to the shaft.

8. The electric motor according to claim 1, wherein the deflector includes an annular portion mounted on and coaxially to the shaft, in the inner space of the casing, the deflecting wall(s) being secured to the face of the annular portion opposite to the rotor.

9. The electric motor according to claim 1, wherein the deflector is made in one piece with a flange which has a disc shape having a diameter substantially identical to the diameter of the rotor, the flange being closely mounted coaxially to the shaft, in the inner space of the casing and adjacent to the corresponding lateral face of the rotor, the deflecting wall(s) projecting from the flange opposite the rotor.

10. The electric motor according to claim 1, wherein the shaft includes at least one front hole in fluid communication with the inner channel and opening into the front inner space of the casing, and a rear hole in fluid communication with the inner channel and opening into the rear inner space of the casing, and in that the motor comprises:
- a front deflector configured to divert the cooling fluid flow opening into the front inner space, from the front hole(s), in the direction of the front bearing;
- and a rear deflector configured to divert the cooling fluid flow opening into the rear inner space, from the rear hole(s), in the direction of the rear bearing.

11. An electric motor comprising:
- a shaft rotatably mounted about an axis;
- a substantially cylindrical rotor securely mounted in rotation on the shaft, the rotor having a front lateral face and a rear lateral face orthogonal to the axis;
- a stator including an annular body which surrounds the rotor coaxially to the shaft, and which has a front lateral face and a rear lateral face orthogonal to the axis, the stator including a winding forming winding heads axially projecting on either side of the body of the stator;
- a substantially cylindrical casing receiving the rotor and the stator, the casing including a peripheral wall, a front wall and a rear wall orthogonal to the axis, an inner space, respectively front and rear, being provided between the front wall of the casing and the front lateral face of the stator, respectively between the rear wall of the casing and the rear lateral face of the stator, the winding heads being housed in the inner spaces;
- the shaft being engaged in an orifice in the front wall and an orifice in the rear wall of the casing, with the interposition of bearings, respectively a front bearing and a rear bearing, the shaft including at least one inner channel for circulating a cooling fluid and at least one hole in fluid communication with the inner channel and opening into at least one of the front, respectively rear inner spaces of the casing;
- wherein the motor comprises a deflector which is fastened with respect to the shaft, and which includes at least one deflecting wall configured to divert in the direction of the corresponding front, respectively rear bearing the cooling fluid flow opening into the inner space from the hole of the shaft, so that the cooling fluid can be projected onto the deflecting wall and spray the bearing, thus ensuring the cooling of the bearing, and in that the deflector includes a collar disposed about the shaft, the deflecting wall(s) being located between the shaft and the collar, secured to the internal face of the collar;
- wherein the shaft includes N holes in fluid communication with the inner channel and opening into an inner space of the casing, with N≥1, where the holes are substantially radial, have the same median plane orthogonal to and are angularly regularly spaced, and in that the deflector comprises a deflecting wall facing each or some of the holes; and
- wherein the collar is discontinuous and includes collar portions spaced circumferentially from each other so as to form an opening between two adjacent collar portions, the deflecting wall(s) being only arranged between the shaft and a collar portion, wherein at least one deflecting wall is located facing a hole of the shaft, and at least one opening is located facing a hole of the shaft.

* * * * *